United States Patent
Crear et al.

(10) Patent No.: US 10,974,474 B2
(45) Date of Patent: *Apr. 13, 2021

(54) APPLICATOR REPAIR FOR ADDITIVE MANUFACTURING SYSTEM

(71) Applicant: General Electric Company, Schenectady, NY (US)

(72) Inventors: Donnell Eugene Crear, Simpsonville, SC (US); Mikhail Pavlov, Dietikon (CH); Felix Martin Gerhard Roerig, Baden (CH); Dean Andrew Snelling, Greenville, SC (US)

(73) Assignee: General Electric Company, Schenectady, NY (US)

( * ) Notice: Subject to any disclaimer, the term of this patent is extended or adjusted under 35 U.S.C. 154(b) by 610 days.

This patent is subject to a terminal disclaimer.

(21) Appl. No.: 15/619,772

(22) Filed: Jun. 12, 2017

(65) Prior Publication Data
US 2018/0354208 A1    Dec. 13, 2018

(51) Int. Cl.
| | |
|---|---|
| *B29C 73/24* | (2006.01) |
| *B33Y 40/00* | (2020.01) |
| *B29C 64/30* | (2017.01) |
| *B29C 73/26* | (2006.01) |
| *B33Y 10/00* | (2015.01) |

(Continued)

(52) U.S. Cl.
CPC ............ *B29C 73/245* (2013.01); *B29C 64/30* (2017.08); *B29C 73/24* (2013.01); *B29C 73/26* (2013.01); *B32B 43/00* (2013.01); *B33Y 10/00* (2014.12); *B33Y 30/00* (2014.12); *B33Y 40/00* (2014.12); *B22F 2003/1056* (2013.01); *B29C 73/163* (2013.01); *B29C 73/34* (2013.01); *B29C 2073/264* (2013.01); *B33Y 80/00* (2014.12)

(58) Field of Classification Search
CPC ....... B29C 73/24; B29C 73/26; B29C 73/345; B29C 73/34; B29C 73/163; B29C 64/30; B29C 2073/264; B29C 64/214; B32B 43/00; B33Y 10/00; B33Y 30/00; B33Y 40/00; B33Y 80/00; B22F 2003/1056
USPC .................................... 425/11, 12, 13, 14
See application file for complete search history.

(56) References Cited

U.S. PATENT DOCUMENTS

| | | |
|---|---|---|
| 6,651,303 B1 | 11/2003 | Toivanen et al. |
| 8,083,513 B2 | 12/2011 | Montero-Escuder et al. |

(Continued)

OTHER PUBLICATIONS

U.S. Appl. No. 15/619,775, Office Action dated Jan. 7, 2019, 11 pages.

(Continued)

*Primary Examiner* — Seyed Masoud Malekzadeh
(74) *Attorney, Agent, or Firm* — Hoffman Warnick LLC

(57) ABSTRACT

An applicator repair system for an additive manufacturing (AM) system, and an AM system including the same are disclosed. The applicator repair system includes a repair device including a repair element configured to repair a damaged applicator element on an applicator of an AM system. The damaged applicator element is configured to distribute a layer of raw material on a build platform of the AM system. The repair device is positioned within a processing chamber of the AM system. A damaged applicator controller may be provided that is configured to cause repair of the damaged active applicator in response to the damaged applicator being identified as damaged.

11 Claims, 5 Drawing Sheets

(51) Int. Cl.
*B33Y 30/00* (2015.01)
*B29C 73/16* (2006.01)
*B29C 73/34* (2006.01)
*B32B 43/00* (2006.01)
*B22F 3/105* (2006.01)
*B33Y 80/00* (2015.01)

(56) References Cited

U.S. PATENT DOCUMENTS

| | | |
|---|---|---|
| 8,366,432 B2 | 2/2013 | Perret et al. |
| 2008/0131540 A1* | 6/2008 | Perret .................. B29C 64/153 425/63 |
| 2011/0156304 A1* | 6/2011 | Walker .................. B23P 15/24 264/219 |
| 2014/0220168 A1* | 8/2014 | Perez .................. B29C 64/379 425/161 |
| 2015/0125333 A1* | 5/2015 | Bruck .................. B33Y 30/00 419/1 |
| 2015/0125335 A1* | 5/2015 | Bruck .................. B23K 26/127 419/26 |
| 2015/0132173 A1* | 5/2015 | Bruck .................. B23K 26/066 419/1 |
| 2015/0290711 A1* | 10/2015 | Norfolk ............. B23K 35/0255 425/78 |
| 2016/0121397 A1 | 5/2016 | Aydin et al. |
| 2016/0159011 A1* | 6/2016 | Marchione ......... G05B 19/4207 700/98 |
| 2016/0236414 A1 | 8/2016 | Reese et al. |
| 2016/0368051 A1* | 12/2016 | Jakimov ................ B33Y 10/00 |
| 2016/0368052 A1* | 12/2016 | Jakimov ................ B33Y 10/00 |

OTHER PUBLICATIONS

U.S. Appl. No. 15/619,775, Notice of Allowance dated May 20, 2019, 11 pages.

* cited by examiner

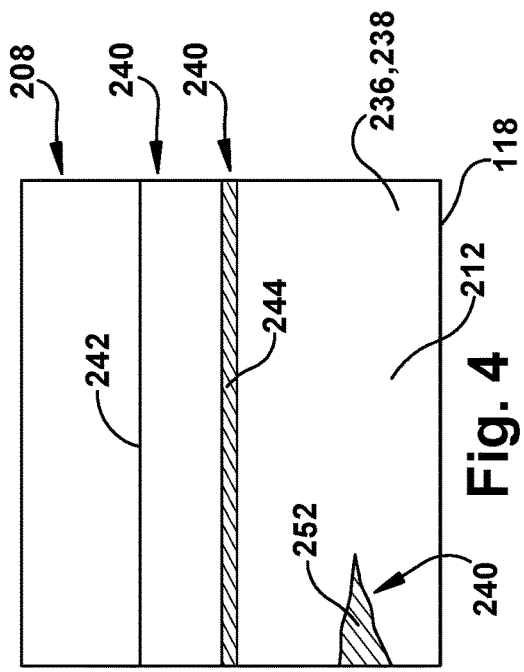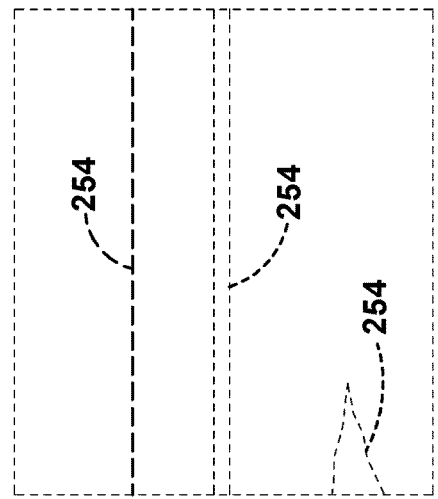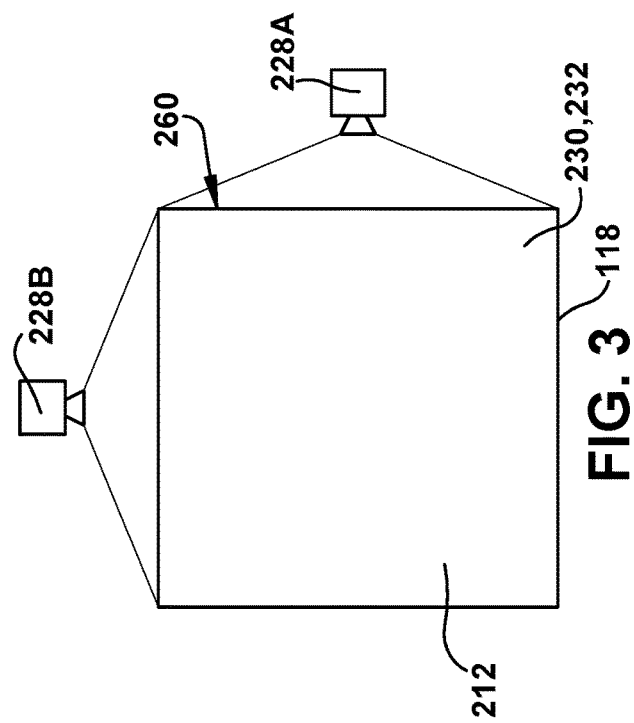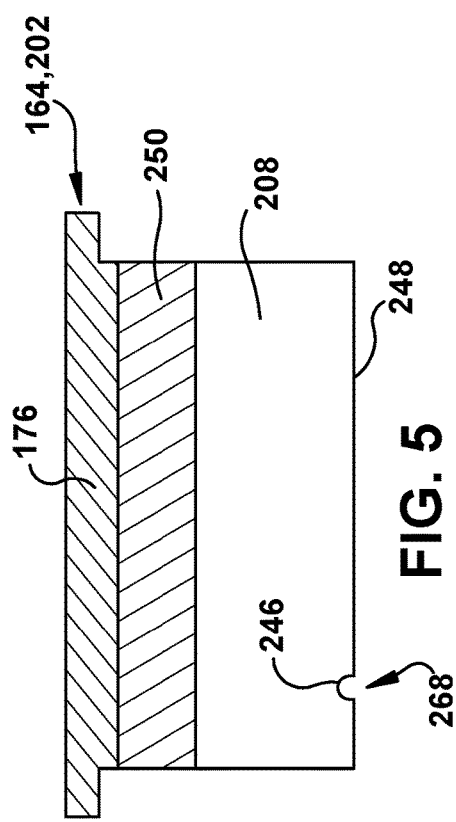

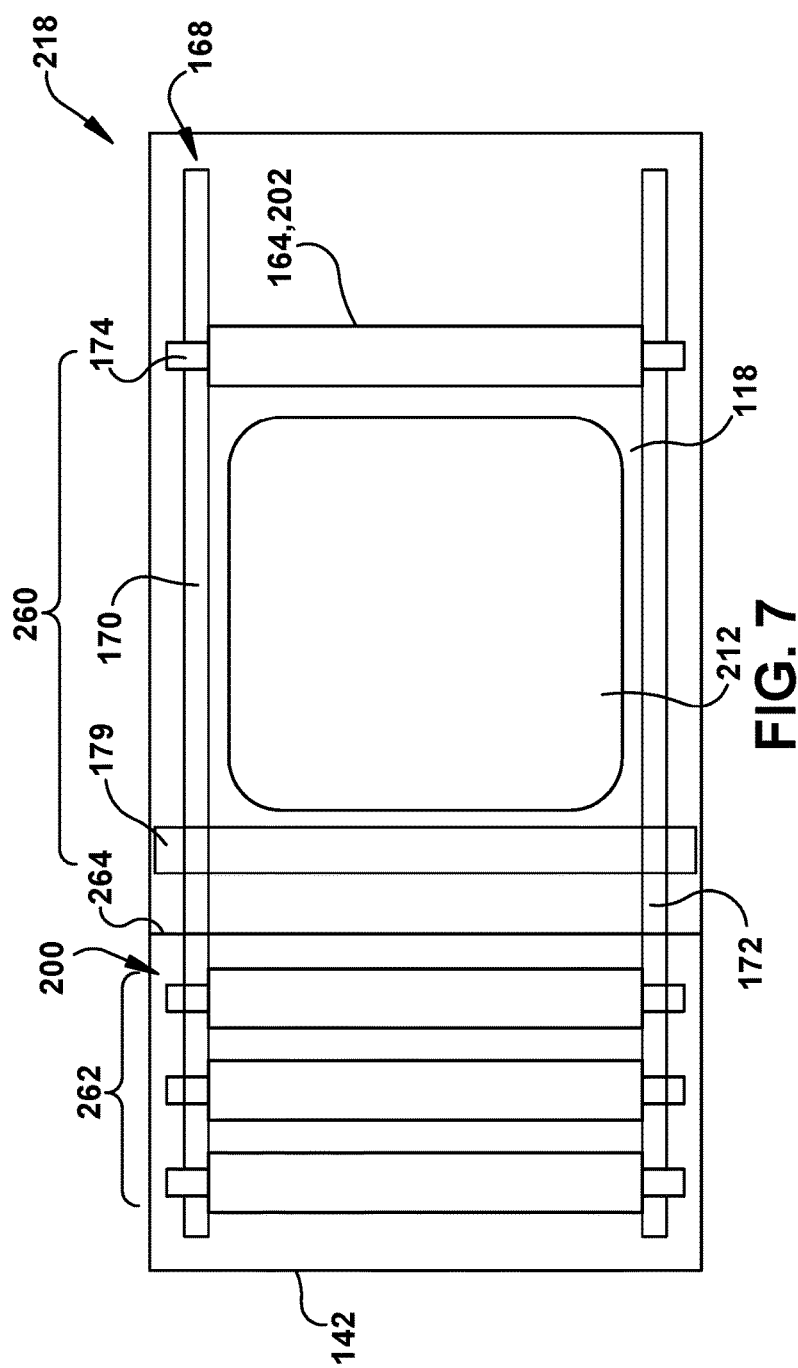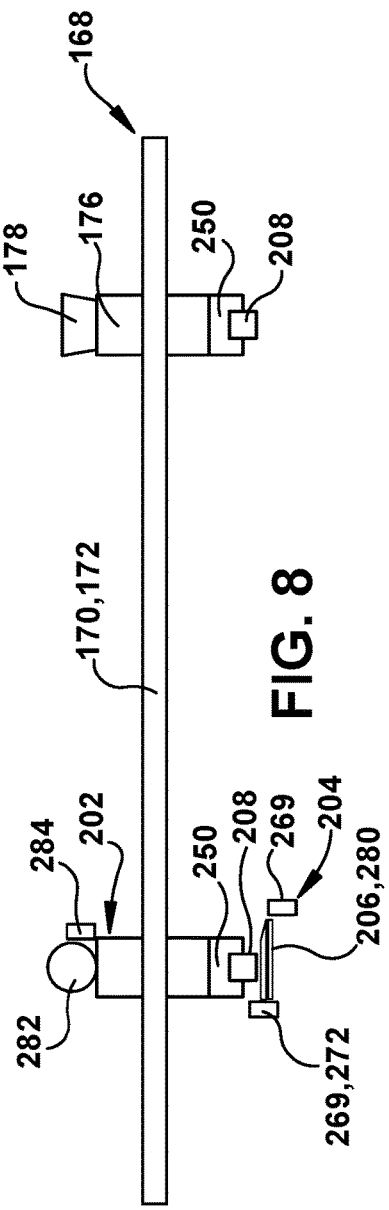

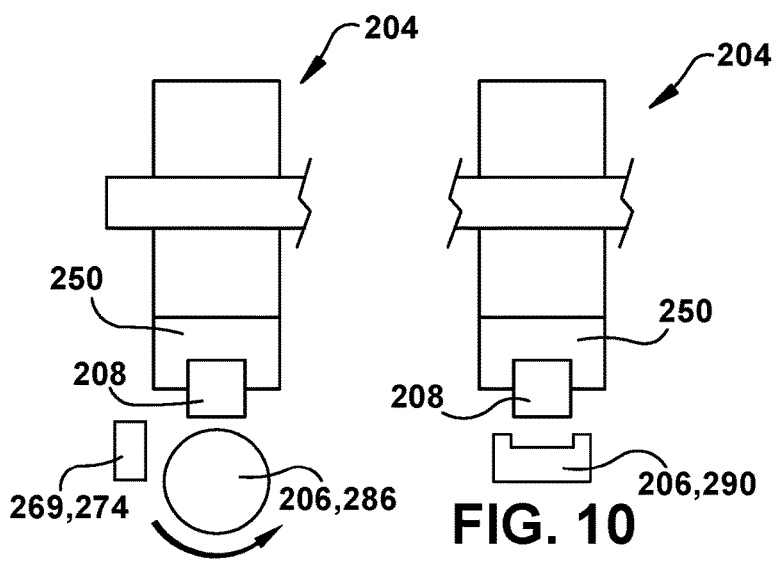
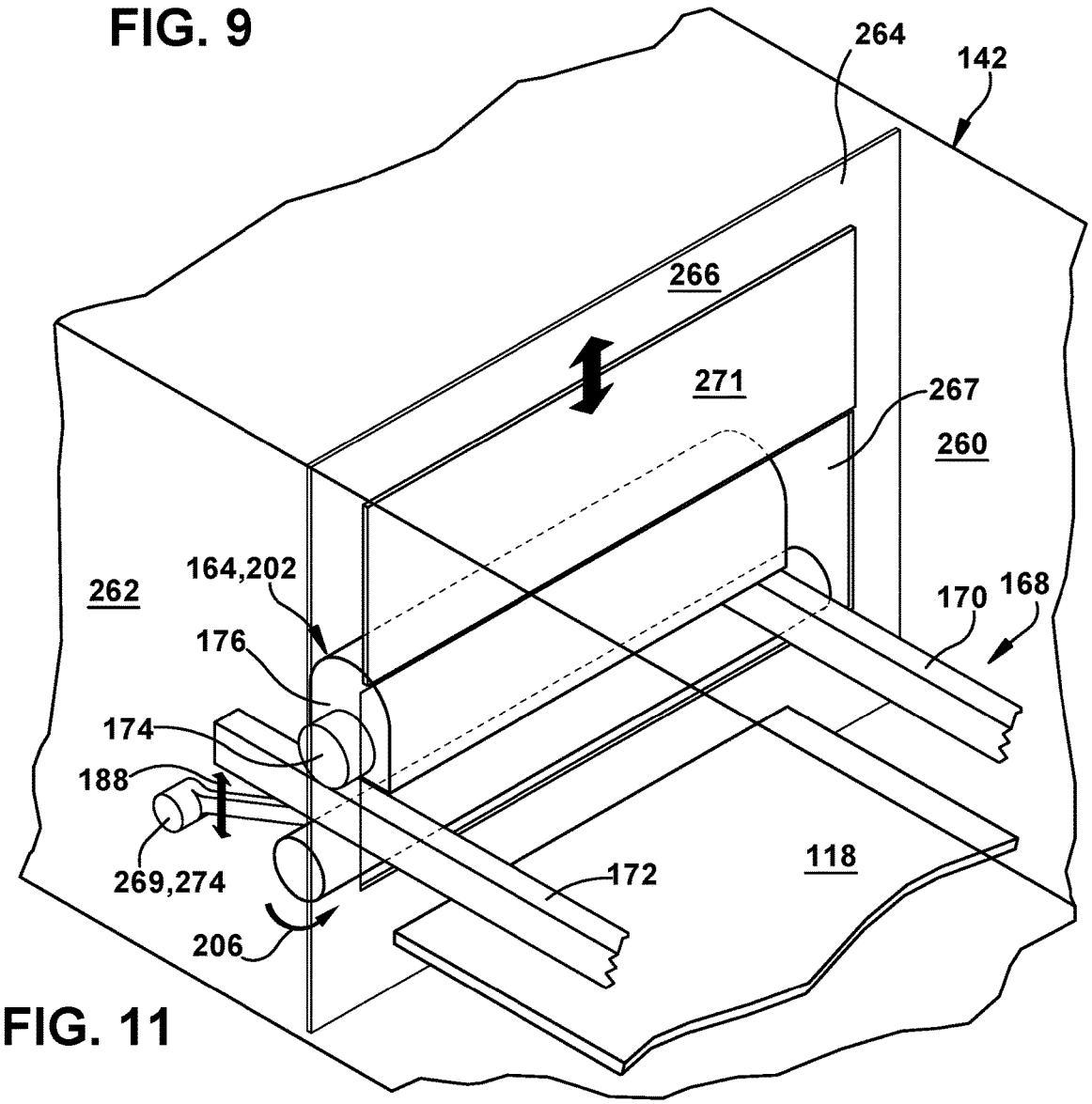

APPLICATOR REPAIR FOR ADDITIVE MANUFACTURING SYSTEM

CROSS-REFERENCE TO RELATED APPLICATIONS

This application is related to U.S. application Ser. No. 15/619,775, now issued as U.S. Pat. No. 10,379,063.

BACKGROUND OF THE INVENTION

The disclosure relates generally to additive manufacturing, and more particularly, to applicator repair for an additive manufacturing (AM) system and an AM system including a repair device for an applicator.

Additive manufacturing (AM) includes a wide variety of processes of producing an object through the successive layering of material rather than the removal of material. As such, additive manufacturing can create complex geometries without the use of any sort of tools, molds or fixtures, and with little or no waste material. Instead of machining components from solid billets of material, much of which is cut away and discarded, the only material used in additive manufacturing is what is required to shape the object.

Additive manufacturing techniques typically include taking a three-dimensional computer aided design (CAD) file of the object to be formed, electronically slicing the object into layers, e.g., 18-102 micrometers thick, and creating a file with a two-dimensional image of each layer, including vectors, images or coordinates. The file may then be loaded into a preparation software system that interprets the file such that the object can be built by different types of additive manufacturing systems. In 3D printing, rapid prototyping (RP), and direct digital manufacturing (DDM) forms of additive manufacturing, material layers are selectively dispensed, sintered, formed, deposited, etc., to create the object.

In metal powder additive manufacturing techniques, such as direct metal laser melting (DMLM) (also referred to as selective laser melting (SLM)), metal powder layers are sequentially melted together to form the object. More specifically, fine metal powder (raw material) layers are sequentially melted after being uniformly distributed using an applicator on a metal powder bed or build platform. The metal powder build platform can be moved in a vertical axis. The process takes place in a processing chamber having a precisely controlled atmosphere of inert gas, e.g., argon or nitrogen. Once each layer is created, each two dimensional slice of the object geometry can be fused by selectively melting the metal powder. The melting may be performed by a melting beam source such as an electron beam or a high powered laser (in latter case, e.g., a 100 Watt ytterbium laser), to fully weld (melt) the metal powder to form a solid metal. The melting beam moves in the X-Y direction using, e.g., scanning mirrors, and has an intensity sufficient to fully weld (melt) the metal powder to form a solid metal. The metal powder build platform is lowered for each subsequent two dimensional layer, and the process repeats until the object is completely formed. In order to create certain larger objects faster, some metal additive manufacturing systems employ two or more high powered melting beam sources that work together to form an object.

In metal powder AM systems, an applicator, sometimes referred to as a recoater or wiper, is used to apply each thin layer of raw material, e.g., metal powder, over the build platform and any previously formed layers of the object. Each applicator includes an applicator element in the form of a lip, brush, blade or roller made of metal, plastic, ceramic, carbon fibers or rubber that spreads the metal powder evenly over the build platform. An active or primary applicator is used to start the build. Because the applicator element is oftentimes made from a softer material than the actual manufacturing material, it is susceptible to damage during use. A damaged applicator may have a defect in the form of a misalignment with the build platform or some sort of defective shape in its applicator element that is transferred into the next layer of raw material applied to the build platform. In any event, the melting beam source subsequently prints the defect into the object. For example, a defective shape in the applicator element can take a variety of forms such as a ridge, ripple, bump, etc., in the layer of raw material. If a defective shape occurs during use, the defective shape will be continuously wiped into the metal powder and the melting beam source will solidify this area as a repeating defect in the object. In order to address this challenge, some current systems change the applicator element between AM system uses, which may require an unscheduled work stoppage and may prolong the use of a damaged applicator until an effective stopping point is reached in the process. Alternatively, some current systems employ either replacement applicators or replaceable applicator elements to replace a damaged applicator when damage is identified on the applicator element, e.g., during use of the AM system.

BRIEF DESCRIPTION OF THE INVENTION

A first aspect of the disclosure provides an applicator repair system for an additive manufacturing (AM) system, the applicator repair system including: a repair device including a repair element configured to repair a damaged applicator element on an applicator, the damaged applicator element configured to distribute a layer of raw material on a build platform of the AM system, wherein the repair device is positioned within a processing chamber of the AM system.

A second aspect of the disclosure provides an additive manufacturing (AM) system, including: a build platform within a processing chamber; a melting beam source for sequentially building an object layer by layer on the build platform; a raw material source operatively coupled to the build platform for providing raw material to the build platform for the sequential building; an applicator system operative to apply a layer of the raw material on the build platform from the raw material source using an applicator having an applicator element, the applicator element configured to distribute a layer of raw material on the build platform; an applicator repair system including a repair device including a repair element configured to repair a damaged applicator element, wherein the repair device is positioned within the processing chamber; and a damaged applicator controller configured to cause the repair of the damaged, applicator element in response to the damaged, applicator element being identified as damaged.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 3 shows a schematic top view of a baseline layer and a baseline image thereof for use in identifying a damaged applicator according to embodiments of the disclosure.

FIG. 4 shows a schematic top view of a test layer and test image for use in identifying a damaged applicator according to embodiments of the disclosure.

FIG. 5 shows a front view of an illustrative applicator including an applicator element and a holder therefor.

FIG. 6 shows a schematic top view of a comparison of a baseline image and a test image for use in identifying a damaged applicator according to embodiments of the disclosure.

FIG. 7 shows a schematic top view and FIG. 8 shows a schematic side view of an applicator system including a repair device to repair a damaged applicator according to an embodiment of the disclosure.

FIG. 9 and FIG. 10 show side views of alternative embodiments of a repair device to repair a damaged applicator according to an embodiment of the disclosure.

FIG. 11 shows a partial side perspective view of a processing chamber including a partition as part of a damage applicator repair system according to embodiments of the disclosure.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated above, the disclosure provides a damaged applicator repair system for an additive manufacturing (AM) system, and an AM system including the same. The damaged applicator repair system includes a repair device including a repair element configured to repair a damaged applicator element on an applicator. The damaged applicator element is configured to distribute a layer of raw material on a build platform of the AM system. The repair device is positioned within a processing chamber of the AM system. A damaged applicator controller may be provided that is configured to cause repair of the damaged active applicator in response to the damaged applicator being identified as damaged.

Figure 1:
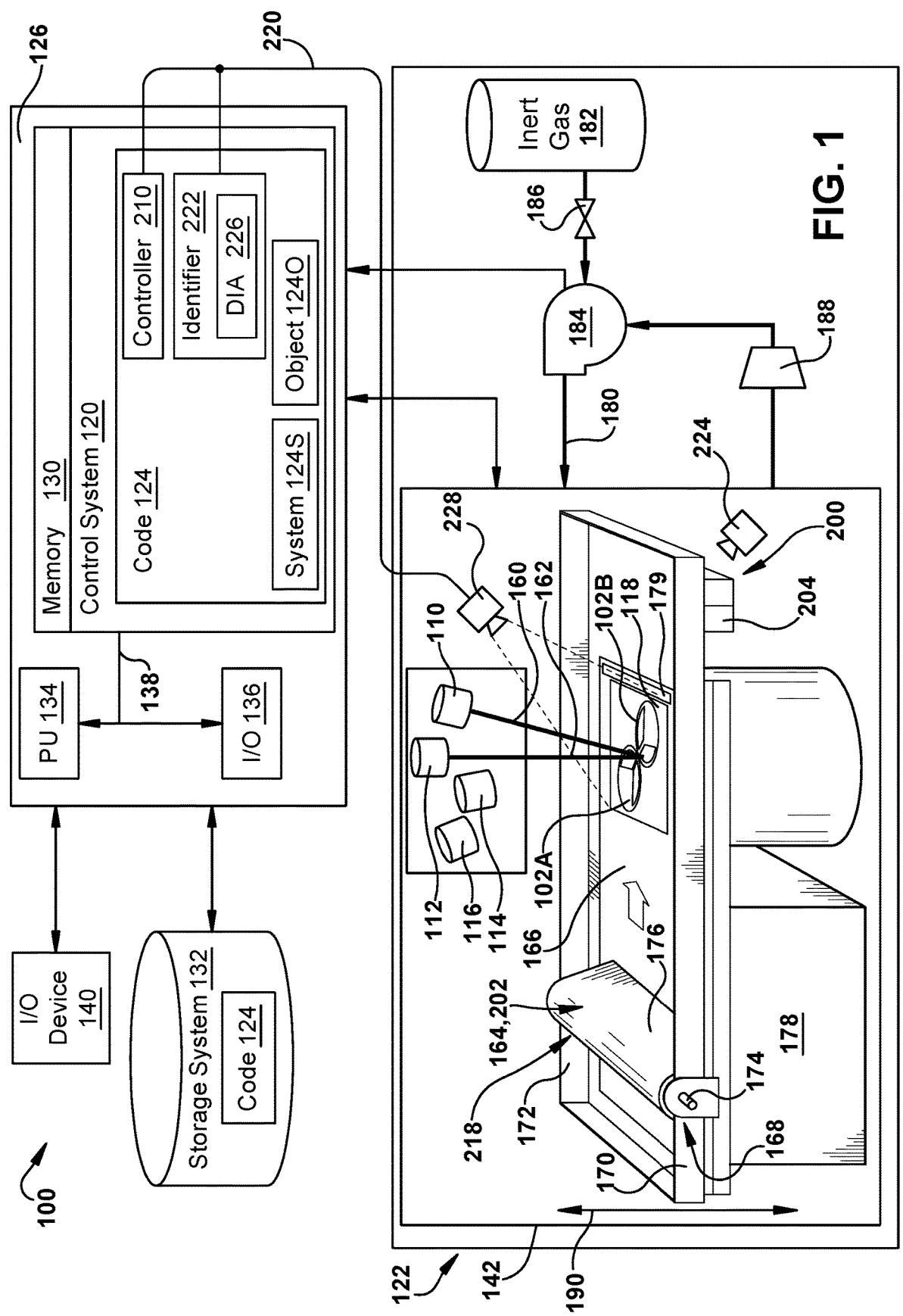
FIG. 1 shows a block diagram of an additive manufacturing process and system employing a damaged applicator repair system according to embodiments of the disclosure.

FIG. 1 shows a schematic/block view of an illustrative computerized metal powder additive manufacturing system 100 (hereinafter 'AM system 100') for generating an object(s) 102, which may include one large object or multiple objects, e.g., two objects 102A, 102B as shown. A single layer of object(s) 102 is shown. The teachings of the disclosure will be described relative to building object(s) 102 using multiple melting beam sources, e.g., four lasers 110, 112, 114, 116, but it is emphasized and will be readily recognized that the teachings of the disclosure are equally applicable to build one object 102 or multiple object(s) 102 using any number of melting beam sources, i.e., one or more. In this example, AM system 100 is arranged for direct metal laser melting (DMLM). It is understood that the general teachings of the disclosure are equally applicable to other forms of metal powder additive manufacturing such as but not limited to direct metal laser sintering (DMLS), selective laser sintering (SLS), electron beam melting (EBM), and perhaps other forms of additive manufacturing. Object(s) 102 are illustrated as circular elements; however, it is understood that the additive manufacturing process can be readily adapted to manufacture any shaped object, a large variety of objects and a large number of objects on a build platform 118.

AM system 100 generally includes a metal powder additive manufacturing control system 120 ("control system") and an AM printer 122. As will be described, control system 120 executes set of computer-executable instructions or code 124 to generate object(s) 102 using multiple melting beam sources 110, 112, 114, 116. In the example shown, four melting beam sources may include four lasers. However, the teachings of the disclosures are applicable to any melting beam source, e.g., an electron beam, laser, etc. Control system 120 is shown implemented on computer 126 as computer program code. To this extent, computer 126 is shown including a memory 130 and/or storage system 132, a processor unit (PU) 134, an input/output (I/O) interface 136, and a bus 138. Further, computer 126 is shown in communication with an external I/O device/resource 140 and storage system 132. In general, processor unit (PU) 134 executes computer program code 124 that is stored in memory 130 and/or storage system 132. While executing computer program code 124, processor unit (PU) 134 can read and/or write data to/from memory 130, storage system 132, I/O device 140 and/or AM printer 122. Bus 138 provides a communication link between each of the components in computer 126, and I/O device 140 can comprise any device that enables a user to interact with computer 126 (e.g., keyboard, pointing device, display, etc.). Computer 126 is only representative of various possible combinations of hardware and software. For example, processor unit (PU) 134 may comprise a single processing unit, or be distributed across one or more processing units in one or more locations, e.g., on a client and server. Similarly, memory 130 and/or storage system 132 may reside at one or more physical locations. Memory 130 and/or storage system 132 can comprise any combination of various types of non-transitory computer readable storage medium including magnetic media, optical media, random access memory (RAM), read only memory (ROM), etc. Computer 126 can comprise any type of computing device such as an industrial controller, a network server, a desktop computer, a laptop, a handheld device, etc.

As noted, AM system 100 and, in particular control system 120, executes code 124 to generate object(s) 102. Code 124 can include, inter alia, a set of computer-executable instructions 124S (herein also referred to as 'code 124S') for operating AM printer 122, and a set of computer-executable instructions 124O (herein also referred to as 'code 124O') defining object(s) 102 to be physically generated by AM printer 122. As described herein, additive manufacturing processes begin with a non-transitory computer readable storage medium (e.g., memory 130, storage system 132, etc.) storing code 124. Set of computer-executable instructions 124S for operating AM printer 122 may include any now known or later developed software code capable of operating AM printer 122.

Set of computer-executable instructions 124O defining object(s) 102 may include a precisely defined 3D model of an object and can be generated from any of a large variety of well-known computer aided design (CAD) software systems such as AutoCAD®, TurboCAD®, DesignCAD 3D Max, etc. In this regard, code 1240 can include any now known or later developed file format. Furthermore, code 1240 representative of object(s) 102 may be translated between different formats. For example, code 1240 may include Standard Tessellation Language (STL) files which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 1240 representative of object(s) 102 may also be converted into a set of data signals and transmitted, received as a set of data signals and converted to code, stored, etc., as necessary. In any event, code 1240 may be an input to AM system 100 and may come from a part designer, an intellectual property (IP) provider, a design company, the operator or owner of AM system 100, or from other sources. In any event, control system 120 executes code 124S and 1240, dividing object(s) 102 into a series of thin slices that assembles using AM printer 122 in successive layers of material.

AM printer 122 may include a processing chamber 142 that is sealed to provide a controlled atmosphere for object(s) 102 printing. A build platform 118, upon which object(s) 102 is/are built, is positioned within processing chamber 142. A number of melting beam sources 110, 112, 114, 116 are configured to melt layers of metal powder on build platform 118 to generate object(s) 102. While four melting beam sources 110, 112, 114, 116 will be described herein, it is emphasized that the teachings of the disclosure are applicable to a system employing any number of sources, e.g., 1, 2, 3, 5 or more. Processing chamber 142 may also include a damaged applicator repair system 200, as will be described in greater detail herein.

Figure 2:
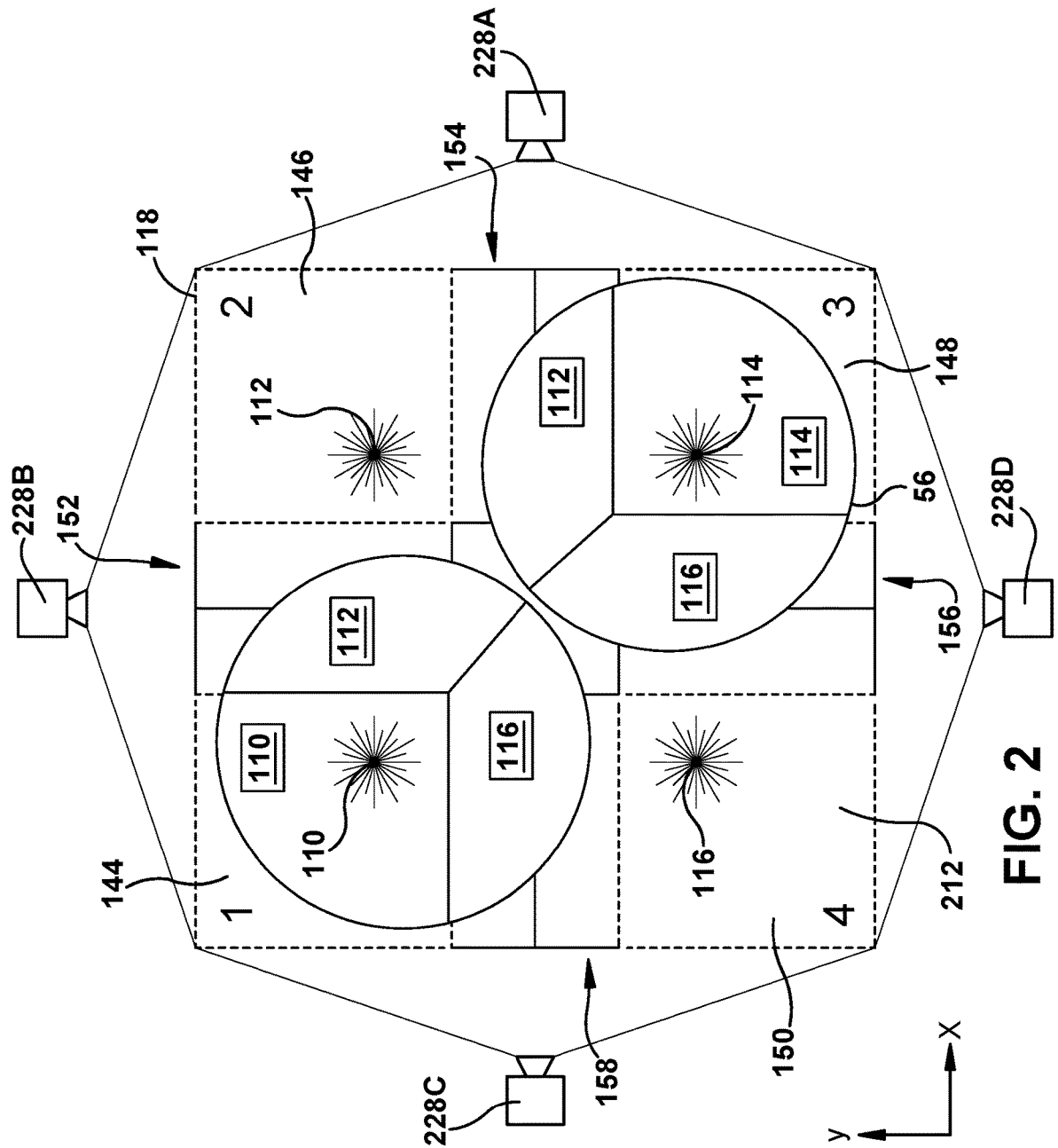
FIG. 2 shows schematic top view of a layer of raw material and including an image capture device of a damaged applicator identifier system according to embodiments of the disclosure.

As shown in the schematic plan view of FIG. 2, each melting beam source 110, 112, 114, 116 has a field 1, 2, 3 or 4 including a non-overlapping field region 144, 146, 148, 150, respectively, in which it can exclusively melt metal powder, and at least one overlapping field region 152, 154, 156, 158 in which two or more sources can melt metal powder. In this regard, each melting beam source 110, 112, 114, 116 may generate a melting beam (two shown, 160, 162, in FIG. 1), respectively, that fuses particles for each slice, as defined by code 1240. For example, in FIG. 1, melting beam source 110 is shown creating a layer of object 102 using melting beam 160 in one region, while melting beam source 112 is shown creating a layer of object 102 using melting beam 162 in another region. Each melting beam source 110, 112, 114, 116 is calibrated in any now known or later developed manner. That is, each melting beam source 110, 112, 114, 116 has had its laser or electron beam's anticipated position relative to build platform 118 correlated with its actual position in order to provide an individual position correction (not shown) to ensure its individual accuracy. In one embodiment, each of plurality melting beam sources 110, 112, 114, 116 may create melting beams, e.g., 160, 162 (FIG. 1), having the same cross-sectional dimensions (e.g., shape and size in operation), power and scan speed. Alternatively, they may have different dimensions, power and/or scan speed.

Returning to FIG. 1, an applicator 164 may create a thin layer of raw material 166 spread out as the blank canvas from which each successive slice of the final object will be created. Applicator 164 may move under control of a linear transport system 168. Linear transport system 168 may include any now known or later developed arrangement for moving applicator 164. In one embodiment, linear transport system 168 may include a pair of opposing rails 170, 172 extending on opposing sides of build platform 118, and an actuator 174 such as an electric motor coupled to a transport member or body 176 of applicator 164 for moving it along rails 170, 172. Actuator 174 may be controlled by control system 120 (and damaged applicator controller 210) to move applicator 164. Other forms of linear transport systems may also be employed. Applicator 164 can take a variety of forms. In one embodiment, applicator 164 may include transport member 176 configured to move along opposing rails 170, 172, and an applicator element 208 (FIG. 5, not shown in FIG. 1) in the form of a tip, blade or brush configured to spread metal powder evenly over build platform 118, i.e., build platform 118 or a previously formed layer of object(s) 102, to create a layer of raw material. Applicator element 208 may be coupled to transport member 176 using a holder 250 (FIG. 5, not shown in FIG. 1) in any number of ways. The process may use different raw materials 166 in the form of metal powder. Raw materials 166 may be provided to applicator 164 in a number of ways. In one embodiment, shown in FIG. 1, a stock of raw material 166 may be held in a raw material source 178 in the form of a chamber accessible by applicator 164. In other arrangements, raw material 166 may be delivered through applicator 164, e.g., through transport member 176 in front of its applicator element 208 (FIG. 5) and over build platform 118 (see, e.g., FIG. 8). Applicator element 208 (FIG. 5) can be made of a variety of materials such as but not limited to: a flexible material like a polymer (hard plastic), a moldable material like a rubber, a metal material such as a metal or metal alloy. In any event, an overflow chamber 179 may be provided on a far side of applicator 164 to capture any overflow of raw material not layered on build platform 118. According to embodiments of the disclosure, while a plurality of applicators can be provided, only one applicator 164 may be needed due to the repair system described herein.

In one embodiment, object(s) 102 may be made of a metal which may include a pure metal or an alloy. In one example, the metal may include practically any non-reactive metal powder, i.e., non-explosive or non-conductive powder, such as but not limited to: a cobalt chromium molybdenum (CoCrMo) alloy, stainless steel, an austenite nickel-chromium based alloy such as a nickel-chromium-molybdenum-niobium alloy (NiCrMoNb) (e.g., Inconel 625 or Inconel 718), a nickel-chromium-iron-molybdenum alloy (NiCrFeMo) (e.g., Hastelloy® X available from Haynes International, Inc.), or a nickel-chromium-cobalt-molybdenum alloy (NiCrCoMo) (e.g., Haynes 282 available from Haynes International, Inc.), etc. In another example, the metal may include practically any reactive metal such as but not limited to: tool, maraging, and stainless steels, Ti-6Al-4V, cobalt chrome molybdenum, AlSi-10Mg, Al—Si-12, Inconel 718 and 625.

Processing chamber 142 is filled with an inert gas such as argon or nitrogen and controlled to minimize or eliminate oxygen. Control system 120 is configured to control a flow of an inert gas mixture 180 within processing chamber 142 from a source of inert gas 182. In this case, control system 120 may control a pump 184, and/or a flow valve system 186 for inert gas to control the content of gas mixture 180. Flow valve system 186 may include one or more computer controllable valves, flow sensors, temperature sensors, pressure sensors, etc., capable of precisely controlling flow of the particular gas. Pump 184 may be provided with or without valve system 186. Where pump 184 is omitted, inert gas may simply enter a conduit or manifold prior to introduction to processing chamber 142. Source of inert gas 182 may take the form of any conventional source for the material contained therein, e.g., a tank, reservoir or other source. Any sensors (not shown) required to measure gas mixture 180 may be provided. Gas mixture 180 may be filtered using a filter 188 in a conventional manner.

A vertical adjustment system 190 may be provided to vertically adjust a position of various parts of AM printer 122 to accommodate the addition of each new layer, e.g., a build platform 118 may lower and/or chamber 142 and/or applicator 164 may rise after each layer. According to embodiments of the disclosure, vertical adjustment system 190 may also be employed to remove a damaged portion of damaged applicator element 208 (FIG. 5) removed during a repair. Vertical adjustment system 190 may include any now known or later developed linear actuators (not shown) to provide such adjustment(s), and which are under the control of control system 120.

In operation, build platform 118 with metal powder thereon is provided within processing chamber 142, and control system 120 controls flow of gas mixture 180 within processing chamber 142 from source of inert gas 182. Control system 120 also controls AM printer 122, and in particular, applicator 164 (e.g., actuator 174) and melting beam sources 110, 112, 114, 116 to sequentially melt layers of metal powder on build platform 118 to generate object(s) 102 according to embodiments of the disclosure. As noted, various parts of AM printer 122 may vertically move via vertical adjustment system 190 to accommodate the addition of each new layer or repair of damaged applicator element 208 (FIG. 5), e.g., a build platform 118 may lower and/or processing chamber 142 and/or applicator 164 may rise after each layer or each repair.

With continuing reference to FIG. 1, according to embodiments of the disclosure, a damaged applicator repair system 200 may be provided for AM system 100 to repair a damaged active applicator 202. As will be described herein, damaged applicator repair system 200 may include a repair device 204 including a repair element 206 (FIGS. 8-10) configured to repair a damaged applicator element 208 (e.g., FIG. 5) on applicator 164. As noted, damaged applicator element 208 is configured to distribute a layer 212 of raw material 166 on build platform 118 of AM system 100. In contrast to conventional systems, repair device 204 is positioned within processing chamber 142 of AM system 100. While damaged applicator repair system 200 will be described relative to a particular applicator system 218 (FIGS. 1 and 7) including a single applicator 164, it is emphasized that it may be employed with a wide variety of applicator systems different than what is illustrated herein.

Damaged active applicator 202 may be identified using any now known or later developed technique. In one example, a user may simply visually identify a damaged active applicator 202 and have damaged applicator repair system 200 repair the applicator, as will be described herein. Alternatively, damaged applicator repair system 200 and AM system 100 may include a damaged applicator identifier system 220. In this case, damaged applicator identifier system 220 may include a damaged applicator identifier 222 configured to determine whether an active applicator, e.g., applicator 164 in FIG. 1, is damaged. Damaged applicator identifier system 220 may use any now known or later developed automated technique for determining whether active applicator 164 is damaged. Typically, these automated techniques employ image capture device(s) 224, 228 to evaluate an applicator element 208. Regardless of technique employed, damaged applicator identifier 222 may include an image capture device 224 or 228 such as but not limited to some form of digital camera. Image capture device 224, 228 may include any now known or later developed ancillary structure and functions necessary to its function such as but not limited to: flash lighting, focus control or shutter control. Damaged applicator identifier 222 may include any number of image capture devices 224, 228 necessary to capture the desired amount of detail, e.g., one or more. In one embodiment, shown in FIG. 2, where a layer of raw material is evaluated to determine whether applicator element 208 is damaged, four image capture devices 228A, 228B, 228C, 228D are arranged around build platform 118 having layer 212 of raw material thereon. In this fashion, for each layer 212 of raw material to be captured, four images can be captured, one from each side of build platform 118. In another embodiment, shown in FIG. 3, only two image capture devices 228A, 228B are employed. In other techniques, where applicator element 208 is evaluated directly, only a single image capture device 224 may be necessary. In any event, where more than one imaged capture device is used, the images from each image capture device, e.g., 228A-D, can be composited, i.e., combined, in any now known or later developed fashion, e.g., with appropriate image rotation and addition thereof using a digital image analyzer (DIA) 216 of damaged applicator identifier 222. For purposes of description, all images herein are illustrated as top down. It is understood however that the images may be captured at any consistent angle between image capture device(s) 224, 228.

Damaged applicator identifier 222 may be implemented, at least in part, as software as part or separate from control system 120 (FIG. 1). According to one technique, damaged applicator identifier 222 may evaluate damaged applicator element 208 directly, e.g., using an image capture device(s) 224 on damaged applicator element 208 (FIG. 5), and a digital image analyzer (DIA) 216 to identify defects from the image. In this case, any defect is identifiable in the image of damaged applicator element 208. In other techniques, damaged applicator identifier 222 may interact with a drag force sensor (not shown) to identify damaged applicator element 208 of damaged active applicator 202 by changes in drag force as it distributes layer 212 of raw material on build platform 118.

In an alternative technique, damaged applicator identifier 222 may evaluate applicator element 208 (FIG. 5) indirectly, e.g., using image capture device(s) 228 and DIA 216 to identify a non-planar surface in a test layer of raw material on build platform 118 of AM system 100 after formation of a layer by active applicator 164. Here, damaged applicator identifier 222 may include, in part, any form of image capture device 228 capable of identifying non-planar surfaces within a layer 212 of raw material applied on build platform 118. FIG. 3 shows a schematic view of a baseline image 230 of a baseline layer 232 of raw material on build platform 118 formed by an undamaged active applicator 164 and taken by damaged applicator identifier 222. Baseline layer 232 has no defects, and hence, baseline image 230 shows no defects. That is, baseline layer 232 is substantially planar, i.e., it includes no defects sufficient to warrant repairing or replacing applicator 164. "Baseline" layer 232 and image 230 are so termed because they act as reference layer/image for identifying damaged applicators, as will be further described. A baseline image 230 of baseline layer 232 can be captured by image capture device(s) 228, for example, after a new applicator element is employed for an active applicator 164 and all calibration necessary has been carried out to the satisfaction of a user that baseline layer 232 includes an ideal or close to ideal planar surface for comparison purposes to later layers that may include defects. In this case, each active applicator 164 may have a respective baseline image 230 captured once it is calibrated and considered to be creating a defect free baseline layer 232. Alternatively, a baseline image 230 can be captured for a particular new applicator 164 with a new applicator element and applied for a number of subsequently used, active applicators 164. In one embodiment, baseline image 230 may be a composite of images from each image capture device 228A-D (FIG. 2) of a particular baseline layer 232 of raw material, which can be formed in any now known or later developed fashion, e.g., with appropriate image rotation and addition thereof using digital image analyzer (DIA) 216 of damaged applicator identifier 222. Alternatively, it can be a single image from a single image capture device 228. In either event, baseline image(s) 230 can be stored in memory 130 and/or storage system 132 for access when necessary.

In contrast, FIG. 4 shows a schematic view of a test image 236 of a test layer 238 of raw material on build platform 118 formed by a damaged active applicator 202 having a damaged applicator element 208 and taken by image capture device(s) 228 of damaged applicator identifier 222. Test image 236 shows a variety defects 240. Each defect 240 creates a non-planar surface in test layer 238. "Test" layer 238 and image 236 are so termed because they are an actual layer and image thereof formed by an active applicator 164 that may include damage. Test image 236 thus may include imagery of defects 240 that can be used for identifying damaged applicators by comparison to baseline image 230, as will be further described. Defects 240 can take a variety of forms such as a raised line 242 or a raised ridge 244, each of which may extend across at least a portion if not all of test image 236. As shown in FIG. 5, raised lines 242 (FIG. 4) and/or raised ridge 244 (FIG. 4) can be formed by any of a variety of forms of opening 246 in a bottom edge 248 of applicator element 208. Applicator element 208 can include a tip, brush or blade, and can be mounted in a holder 250 that is coupled to transport member 176 of applicator 164. Alternatively, as shown in FIG. 4, a defect 252 may take the form of a bump or ripple formed, for example, by damaged applicator element 208 pushing metal powder into a pile on layer 212, or defect 252 may take the form of an indentation formed, for example, by applicator element 208 causing a digging into test layer 238 (directly or indirectly). In one embodiment, test image 236 may be a composite of images from each image capture device 228A-D (FIG. 2) of for particular test layer 238 of raw material, which can be formed in any now known or later developed fashion, e.g., with appropriate image rotation and addition thereof using digital image analyzer (DIA) 216 of damaged applicator identifier 222. Alternatively, it can be a single image from a single image capture device 228. Test image 236 can be stored in memory 130 and/or storage system 132 for access when necessary. Test image 236 can be captured at any desired time during use of a particular active applicator 164, e.g., prior to initial use, after a selected number of uses, after a selected duration of use, etc.

In operation according to this technique, damaged applicator identifier 222, using digital image analyzer 216, can determine whether active applicator 164 is damaged by identifying a non-planar surface, e.g., including defects 240 (FIG. 4), in test layer 238 of raw material on build platform 118 of AM system 100 after formation of test layer 238 of raw material by active applicator 164. More particularly, damaged applicator identifier 222 can identify the non-planar surface (FIG. 4) by comparing a baseline image 230 of a surface of a baseline layer 232 of raw material on build platform 118 of AM system 100 after formation of the baseline layer 232 by an undamaged active applicator 164 to test image 236 of test layer 238 of raw material on build platform 118 of AM system 100 after formation of test layer 238 by active applicator 164. Each of baseline image 230 and test image 236 may be composite images formed from a number of image captures from a plurality of sides about respective baseline layer 232 or test layer 238. A variety of now known techniques are available to identify differences between images so that defects 240 can be identified, all of which are considered within the scope of the disclosure. In one example, the comparing may include determining a number of pixels remaining after subtracting baseline image 230 from test image 236, and identifying existence of the non-planar surface, i.e., defects 240 and damaged active applicator 202, in response to the number of pixels exceeding a threshold. The threshold can be user selected to be any number of pixels sufficient to indicate the presence of defects 240 (FIG. 4), a non-planar surface in test layer 238 and thus a damaged active applicator 202. FIG. 6 shows a schematic top view of the result of comparing baseline image 230 (FIG. 3) to test image 236 (FIG. 4), resulting in pixels 254 remaining of the images from some of defects 242, 244, 252. In the example shown, defect 240 in the form of raised line 242 (FIG. 4) shows a number of pixels to perhaps exceed a threshold, while defects 244, 252 may not have sufficient pixel numbers to exceed a threshold. It is emphasized that a variety of alternative techniques may be employed other than pixel counting to determine the presence of a non-planar surface in test layer 238 sufficient to indicate a damaged applicator. In any event, the comparison can be carried out at any desired time during use of a particular active applicator 164, e.g., after a selected number of uses, after a selected duration of use, etc.

With further regard to damaged applicator repair system 200, as shown in FIG. 1, the system may also include a damaged applicator controller 210 configured to cause repair of a damaged active applicator 202 in response to a damaged active applicator 202 being identified by any of the techniques described herein. As shown in FIG. 1, parts of damaged applicator identifier 222 and/or damaged applicator controller 210 may be incorporated as part of control system 120, e.g., as software and/or hardware. However, each may be a separate component that interacts with control system 120 and/or parts of AM printer 122.

Referring to FIGS. 7-10, embodiments of repair device 204 used with damaged applicator repair system 200 according to embodiments of the disclosure will now be described. FIG. 7 shows a schematic top view and FIG. 8 shows a schematic side view of linear transport system 168 including an active applicator 164 that also constitutes a damaged active applicator 202. FIGS. 9 and 10 show schematic side views of alternative embodiments of repair device 204. An active applicator 164 may be structured as described previously relative to applicator 164 in FIG. 1, e.g., it may include its own actuator 174 under control of control system 120 (and controller 210) (FIG. 1). That is, active applicator 164 may be positioned relative to build platform 118 and repair device 204 with linear transport system 168 under control of damaged applicator controller 210 (and control system 120) (FIG. 1). In this case, linear transport system 168 includes an active applicator area 260 in which active applicator 164 is movable over build platform 118 to apply layer 212 of raw material on build platform 118, and a repair area 262 in which a damaged, active applicator 208 and repair device 204 are located, and damaged, active applicator 208 is accessible to repair device 204. Each area 260, 262 may be, for example, indicative of a location within processing chamber 142 and on rails 170, 172.

Where a damaged active applicator 202 has been identified, e.g., by damaged applicator identifier 222, damaged applicator controller 210 directs linear transport system 168 to move damaged active applicator 202 to repair area 262, and directs repair device 204 to repair damaged applicator element 208. In an alternative embodiment, as shown in FIGS. 7 and 11, processing chamber 142 includes repair area 262, active applicator area 260, and linear transport system 168 located within. Linear transport system 168 may optionally include a partition 264 in processing chamber 142 separating repair area 262 from active applicator area 260. Partition 264 may be implemented in a number of ways. In the example shown in FIG. 11, partition 264 may include a separating wall 266 sealing separating repair area 262 and active applicator area 260. Separating wall 266 may include a selectively opening passage 267 through which applicator 164 may pass into repair area 262, i.e., on rails 170, 172 of linear transport system 168. Selectively opening passage 267 may have a door 271 that is openable and closable by damaged applicator controller 210, which may also coordinate movement of applicator 164 using actuator 174. Door 271 can take any form of selectively opening closure, e.g., slide door, a pivoting door, etc., and can be actuated using any now known or later developed door actuating systems. In this fashion, repair area 262 can be sealingly separated from active applicator area 260 for repair of a damaged active applicator 202 including, for example, removal of material (i.e., of a damaged portion 268 (FIG. 5)) from a damaged applicator element 208 in such a manner that the removed material does not contaminate the rest of processing chamber 142. Any form of vertical adjustment system 288 may be employed to move repair system 206 into and out of an operative position relative to a damaged applicator.

As shown in FIGS. 7-10, repair device 204 can take a variety of forms depending on the form of applicator element 208 employed on active applicator 164. In a number of the embodiments, repair device 204 repairs damaged applicator element 208 by removing damaged portion 268 (FIG. 5) from damaged applicator element 208. The form of damaged portion 268 removed depends on the type of damaged applicator element 208, e.g., flexible material, metal, etc. Where material is removed, damaged applicator repair system 200 may further include a material removal system 269 configured to remove damaged portion 268 (FIG. 5) from processing chamber 142 during or after the repair. As will be described, material removal system 269 may take different forms depending on the type of damaged applicator element 208 employed.

In one embodiment, shown in FIG. 8, applicator element 208 may include a flexible material, like a polymer or plastic. In this case, repair device 204 includes repair element 206 in the form of a cutting device 280, e.g., a cutting blade, configured to cutoff damaged portion 268 (FIG. 5) of damaged applicator element 208 in such a way as to provide a clean new surface therefor. Here, damaged portion 268 may include one or more pieces of the flexible material (e.g., chunk(s) or strip(s)), and material removal system 269 may include a catch basin 272 to capture damaged portion 268 (FIG. 5). The repaired applicator can then be put back into service by damaged applicator controller 210, perhaps after some re-calibration of AM system 100. As shown best in FIG. 8, where applicator element 208 includes a flexible material, a supply of flexible material 282 may be carried on active applicator 164, i.e., on transport member 176, for feeding additional applicator element material through holder 250 as it is used up. Repair device 204 may further include a flexible material positioner 284 for obtaining a replacement portion for damaged portion 268 of the flexible material from supply of flexible material 282. Flexible material positioner 284 may include any now known or later developed mechanism for controllably measuring and feeding a replacement portion of flexible material from supply of flexible material 282. Flexible material positioner 284 may include but is not limited to: a roller for controlled unrolling of flexible material, a grasping element for controlled unrolling of flexible material, etc.

In FIG. 9, applicator element 208 may include a blade, e.g., a metal or metal alloy blade. In this case, repair device 204 may include a grinding device 286, e.g., a grinding wheel or belt, configured to grind a damaged portion of applicator element 208 in such a way as to provide a clean new surface therefore. The repaired applicator can then be put back into service as an active applicator 164, perhaps after some re-calibration of AM system 100. Here, damaged portion 268 may include metal powder or particles, and material removal system 269 may include a vacuum system 274 (see e.g., FIG. 11) to capture the damaged portion.

In FIG. 10, applicator element 208 may include a moldable material, e.g., a soft plastic, rubber or moldable polymer. In this case, repair device 204 may include a molding device 290, e.g., a shaped heating element, configured to re-shape a damaged portion of damaged applicator element 208 in such a way as to provide a clean new surface therefor. The repaired applicator can then be put back into service, perhaps after some re-calibration, as an active applicator 164.

In any of the above-described embodiments, repair device 204 may include any ancillary control structures (not shown) necessary for controlled application thereof and controlled by damaged applicator controller 210. Ancillary control structures may include but are not limited to: motion controllers; sensor(s) for positioning, force, temperature, etc.; or quality assurance monitors. In operation, upon damaged active applicator 202 being identified, e.g., by damaged applicator identifier 222, damaged applicator controller 210 moves damaged, active applicator 164 to repair area 262 and causes repair device 204 to repair damaged active applicator 202. Once repaired, damaged applicator controller 210 then puts the applicator back in service. As part of a re-calibration process, repair device 204 may supply a size of damaged portion 268 to control system 120 of AM system 100 for adjusting of AM system 100 to accommodate the removal of damaged portion 268. For example, where a one millimeter strip of flexible material has been cut off of damaged applicator element 208, AM system 100 may raise build platform 118 by one millimeter to accommodate the shorter, repaired applicator element. Similar adjustments can be made for the other repair device embodiments. The repair process can repeat as many times as necessary (applicator element material capability of repair withstanding) during operation of AM system 100 to ensure an undamaged applicator is always in service.

Another embodiment of the disclosure may include AM system 100 including build platform 118 (FIG. 1), and a melting beam source(s) 110, 112, 114, 116 (FIG. 1) for sequentially building an object 102 layer by layer on build platform 118. AM system 100 may also include a raw material source 178 operatively coupled to build platform for providing raw material to build platform for the sequential building, i.e., as a hopper for accessing by an active applicator or carried by an active applicator (see e.g., FIG. 8). AM system 100 further includes an applicator system 218 (any applicator system described herein) operative to apply layer 212 of the raw material on build platform 118 from the raw material source using an active applicator. In one embodiment, as shown in one example in FIGS. 7 and 8, damaged applicator repair system 200 may include a repair device 204 configured to repair a damaged applicator element 208 (e.g., FIG. 5) on applicator 164. In any event, linear transport system 168 may move applicators, as discussed herein. AM system 100 may also optionally include damaged applicator identifier 222, as described herein, for determining whether the active applicator is damaged, e.g., by identifying a non-planar surface in a layer of raw material on the build platform after formation of the layer by the active applicator. AM system 100 may also include damaged applicator controller 210 configured to cause repair of the damaged active applicator 202 in response to the damaged applicator being identified as damaged.

Embodiments of the disclosure provide damaged applicator repair system 200 capable of repairing a damaged applicator (e.g., an applicator element in the form of a blade, brush or lip/wiper). Consequently, embodiments of the disclosure can be employed within a processing chamber of an AM system 100 in such a way as to eliminate the need to open the processing chamber or stop a build in order to fix a damaged applicator. That is, any of the embodiments described herein can operate during an object build to repair an active applicator during the build. (The entire system is located within processing chamber 142 (FIG. 1)). Once a repaired applicator is in place, an object build can proceed as originally intended unless another instance of application damage was to occur, then at that time, AM system 100 would once again perform the previously described procedure to repair the active applicator. Embodiments of the disclosure are able to minimize a defect to only the region of the build that caused it without passing it to the entirety of the remainder of the build, and without canceling a build or opening the processing chamber. Consequently, a particular object build now has a better chance of recovering the build when a damaged applicator issue arises rather than having to cancel it at the time of applicator damage, or scrap the applicator after the build completes.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An applicator repair system for an additive manufacturing (AM) system, the applicator repair system comprising:
    a repair device including a repair element configured to replace or repair a damaged applicator element on an applicator, the applicator positioned relative to a build platform of the AM system to apply a layer of raw material on the build platform,
    wherein the repair device is positioned within a processing chamber of the AM system, the processing chamber of the AM system including:
    an active applicator area in which an active applicator is movable relative to the build platform to apply the layer of raw material on the build platform from a raw material source;
    a repair area located inside the processing chamber, and wherein the damaged applicator element and the repair device are located within the repair area; and
    a partition in the processing chamber separating the repair area from the active applicator area, wherein the partition includes a separating wall separating the repair area and the active applicator area.

2. The system of claim 1, further comprising a damaged applicator controller configured to cause replacement or repair of the damaged applicator element in response to the active applicator being identified as damaged.

3. The system of claim 2, further comprising a damaged applicator identifier configured to identify whether the active applicator is damaged.

4. The system of claim 2, further comprising a linear transport system under control of the damaged applicator controller for positioning the damaged applicator element relative to the build platform of the AM system and the repair device.

5. The system of claim 1, wherein the repair device replaces or repairs the damaged applicator element by removing a damaged portion from the damaged applicator element.

6. The system of claim 5, further comprising a material removal system configured to remove the damaged portion from the processing chamber during or after replacement or repair of the damaged applicator element.

7. The system of claim 5, wherein the repair device supplies a size of the damaged portion to a control system of the AM system for adjusting of the AM system to accommodate a removal of the damaged portion.

8. The system of claim 1, wherein the damage applicator element includes a flexible material, and the repair element includes a cutting device configured to remove a damaged portion of the flexible material from the damaged applicator element.

9. The system of claim 8, wherein the applicator carries a supply of the flexible material, and the repair device further includes a flexible material positioner for obtaining a replacement portion for the damaged portion of the flexible material from the supply of the flexible material.

10. The system of claim 1, wherein the damaged applicator element includes a metal material, and the repair element includes a grinding device configured to remove a damaged portion of the metal material from the damaged applicator element.

11. The system of claim 1, wherein the damaged applicator element includes a moldable material, and the repair element includes a molding device configured to reshape a damaged portion of the moldable material of the damaged applicator element.

* * * * *